United States Patent [19]
Ashwell

[11] Patent Number: 5,510,200
[45] Date of Patent: Apr. 23, 1996

[54] FILMS FOR NON-LINEAR OPTICS

[75] Inventor: Geoffrey J. Ashwell, Shelfleys, England

[73] Assignee: British Technology Group Limited, London, England

[21] Appl. No.: 70,341

[22] PCT Filed: Nov. 27, 1991

[86] PCT No.: PCT/GB91/02096

§ 371 Date: Aug. 30, 1993

§ 102(e) Date: Aug. 30, 1993

[87] PCT Pub. No.: WO92/09374

PCT Pub. Date: Jun. 11, 1992

[30] Foreign Application Priority Data

Nov. 28, 1990 [GB] United Kingdom ............... 9025832

[51] Int. Cl.⁶ ...................................... B32B 9/04
[52] U.S. Cl. .................. 428/704; 428/411.1; 428/419; 428/910; 428/913
[58] Field of Search .................. 428/419, 704, 428/910, 913, 411.1

[56] References Cited

FOREIGN PATENT DOCUMENTS

| | | |
|---|---|---|
| 0203780 | 12/1986 | European Pat. Off. . |
| 0293093 | 11/1988 | European Pat. Off. . |
| 0301411 | 2/1989 | European Pat. Off. . |
| 0432619A2 | 6/1991 | European Pat. Off. . |
| WO87/00347 | 1/1987 | WIPO . |

OTHER PUBLICATIONS

Winant, P. et al "Absorption, reflection and second . . . " Non–Linear Optical Materials 11, vol. 1127 (1989), p. 132.

Zhang, T. G. et al, "Determination of Molecular Orientation . . . " Jour of the Optical Society of America B, vol. 7 No. 6, (Jun. 1990) New York, USA, 902–907.

Neal, D. B. et al. "Second Harmonic Generation . . . " Electronics Letters, vol. 22 No. 9 (24 Apr. 1986), pp. 460–461.

Pardoen, J. A. et al "Optical Properties of pyrromethene . . . " Jour of Physical Chemistry, vol. 89 No. 20 (26 Sep. 1985) Easton, USA, pp. 4272–4277.

*Primary Examiner*—L. Kiliman
*Attorney, Agent, or Firm*—Nixon & Vanderhye

[57] ABSTRACT

Multi-layer Langmuir-Blodgett films comprising alternate layers of an optically non-linear amphiphilic compound and a spacer compound wherein the spacer comprises at least two hydrophobic substituents, have high second order non-linear optical coefficients, are stable over a prolonged period and quadratic SHG enhancement based on the number of layers. They are useful in a variety of opto-electronic devices.

29 Claims, 1 Drawing Sheet

FILMS FOR NON-LINEAR OPTICS

The present invention relates to novel optically non-linear materials comprising a multi-layer Langmuir-Blodgett film; to methods for their production and to optical devices which incorporate such films.

BACKGROUND OF THE INVENTION

Interest in molecules which consist of a donor part (D) linked via an extended π-electron bridge to an acceptor part (A) stems from their potential nonlinear optical applications. They are capable of exhibiting second harmonic generation but for their second order molecular hyperpolarisabilities (β) to be preserved as a bulk property it is necessary to suppress the tendency of the molecules to stack centrosymmetrically.

Most materials with large second-order nonlinearities form centrosymmetric (Y-type) Langmuir-Blodgett films, an example being E-N-docosyl-4-[2-(4-dimethylaminophenyl)ethenyl] pyridinium bromide, a hemicyanine dye reported by Gitling et al. (Thin Solid Films 132, 101, 1985). For second harmonic generation it is necessary for the films to be noncentrosymmetric (X-type or Z-type). We have discovered that E-N-octadecyl-4-[2 -(4-dimethylaminophenyl)ethenyl] pyridinium iodide generates a more intense second harmonic signal than has been obtained previously from hemicyanine dyes. We believe that this compound is novel and it forms one aspect of our invention. Langmuir Blodgett films which comprise this novel hemicyanine dye are also believed to be novel and they constitute a second aspect of this invention.

However, only relatively modest second harmonic intensities have been obtained from monolayer films of the hemicyanine dyes including the dye referred to above and in each case, the signal diminishes for the bilayer.

To overcome this problem attempts have been made to interleave the optically active layers with spacers, generally a fatty acid. The technique has met with limited success, one of the best examples so far being N-ethyl-N-octadecylaminostilbazolium poly-(epichlorohydrin) interleaved with behenic acid (Anderson et al., Thin Solid Films 179, 413, 1989); the second harmonic intensity from 25 bilayers is 265 times that from the monolayer, the signal falling short of the theoretical quadratic dependence, $I_{(n)} = I_{(1)} n^2$ where n is the number of active layers.

DESCRIPTION OF THE INVENTION

We have discovered that optically non-linear materials comprising a multi-layer Langmuir-Blodgett film which can show quadratically enhanced second harmonic generation may be prepared by depositing alternate layers comprising an optically non-linear amphiphilic compound and a spacer molecule which comprises at least two hydrophobic substituents each of which comprises a minimum of six carbon atoms as part of its molecular structure. Such materials are advantageous in that they may have a second order non-linear optical coefficient d of up to 50 pm/V or possibly higher. Furthermore, the materials of this invention may be stable (insofar as their non-linear optical properties are concerned) over a prolonged period which is clearly advantageous in relation to their use and also they are ordered and may exhibit comparatively low scatter or loss. All of these advantages render the materials of this invention especially valuable in opto-electronic devices of various kinds.

Ordered noncentrosymmetric optically non-linear materials comprising a multi-layer Langmuir-Blodgett film which comprises alternate layers of an optically nonlinear amphiphilic compound and a spacer compound which comprises at least two hydrophobic substituents each of which contains at least six carbon atoms are believed to be novel and constitute a further aspect of this invention.

The spacer molecules which are useful in the materials of this invention are preferably those which can readily be deposited to form a good Langmuir-Blodgett film with a transfer ratio of close to unity. The ability of any particular molecule to form such a film may be assessed empirically using known techniques in the art. The spacer molecules useful in this invention are characterised by the presence of at least two hydrophobic substituents each having at least six carbon atoms as part of their molecular structure. Without wishing to be bound by any theory the applicants believe that the presence of two substituents rather than the single hydrophobic group present in the fatty acid spacers of the prior art enables the spacer layer to interlock with the hydrophobic portion of the optically non-linear amphiphilic compound to maximise the non-centrosymmetric alignment of the interleaved material.

The preferred spacer molecules may be represented as having a molecular structure of the type:

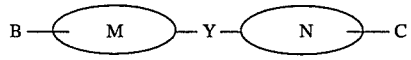

wherein M and N represent carbocyclic or heterocyclic groups having at least one hydrophobic substituent group B or C which comprises at least six carbon atoms and Y represents a divalent bridging group or atom.

Preferably the divalent group Y which bridges the cyclic rings M and N is a relatively short one containing no more than four atoms in a chain. Examples of preferred groups Y include a methylene group $CH_2$ and an ethylene group $C_2H_4$. In a further preferred embodiment the rings M and N represent unsaturated carbocyclic or heterocyclic ring systems and Y represents an unsaturated linkage so that the spacer is a conjugated compound wherein the conjugation extends across the bridging group. M and N which may be same or different may represent a variety of monocyclic or heterocyclic rings which are preferably unsaturated ring systems. Examples of preferred ring systems which may be represented by M and N include benzene pyridine and pyrole. Each ring system preferably has only one substituent B or C although other substituents for example alkyl groups having less than six carbon atoms may be present.

The hydrophobic substituent groups B and C may be the same or different. Preferably B and C represent alkyl, alkenyl, alkanoyl or alkoxy groups comprising from 8 to 30 carbon atoms, more preferably from 14 to 22 carbon atoms. In the most preferred materials B and C represent straight chain alkyl groups and most preferably B and C are identical.

A particular preferred class of spacer molecules useful according to the present invention are those having the formula I

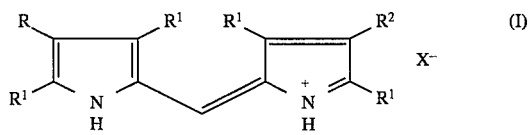

wherein R and $R^2$ which may be the same or different represent alkyl, alkenyl, alkoxy or alkanoyl groups having from 6 to 30 carbon atoms and $R^1$ may represent a hydrogen atom or an alkyl or alkenyl group comprising from 1 to 4 carbon atoms and $X^-$ represents a counter-ion which is preferably a halide ion.

The preferred compounds of Formula I are those wherein $R^1$ represents a hydrogen atom or a methyl group. Preferably the substituents $R^1$ are identical. The substituents R and $R^2$ preferably represent straight chain alkyl groups having from 8 to 30 carbon atoms. Preferably R and $R^2$ are identical and represent alkyl groups having from 14 to 22 carbon atoms. $X^-$ preferably represents a chloride, bromide or iodide ion.

The compounds of Formula I may be prepared using the conventional techniques of synthetic organic chemistry. The general synthetic method described by Fischer and Kirstahler in Ann. 466, 178 of 1928 may conveniently be employed.

The Langmuir-Blodgett films of this invention may comprise any optically nonlinear amphiphilic compounds of general formula D-$\pi$-A where D is an electron-donor, $\pi$ is a conjugated bridge and A is an electron acceptor. Preferred compounds have the formula R—A$^+$—CH=CH—D X$^-$(IIa) or R—D—CH=CH—A$^+$ X$^-$(IIb)

in which the acceptor group (A) is a pyridinium, pyrimidinium, quinolinium, isoquinolinium, benzothiazolium or thiazolium cation; the donor group (D) is, for example, N,N'-dialkylnaphthylamine or N,N'-dialkylaniline; R is a hydrophobic alkyl or alkoxy chain containing 6 to 22 carbon atoms and is attached to the N-atom of the heterocycle or to the N-atom of the amine; $X^-$ is a counterion, preferably a halide. The compounds may be synthesised by the adaptation of known methods.

The novel interleaved Langmuir-Blodgett films may be deposited on hydrophilically treated glass substrates by known methods, for example, by using a two-compartment Nima Technology trough. The materials may be spread from Aristar grade dichloromethane on the pure water subphase of separate compartments of the trough and compressed to ca. 25 mN m$^{-1}$. The optically active component (II) may be deposited on the first upstroke followed by the spacer (I) on the downstroke. Ordered multilayer films may be fabricated by repeating the procedure. Such processes are believed to be novel and constitute a further aspect of the invention.

BRIEF DESCRIPTION OF THE DRAWINGS

The invention will now be described in more detail with reference to the accompanying drawings, in which.

EXAMPLES

The invention is now illustrated by the following examples.

LB films were deposited on hydrophilically treated glass substrates using a two-compartment Nima trough:

The hemicyanine (E-N-octadecyl-4-[2-(4-dimethylaminophenyl) ethenyl]pyridinium iodide) and spacer (4,4'-dioctadecyl-3,5,3',5'-tetramethyldipyrrylmethene hydrobromide) were spread from Aristar grade dichloromethane on the pure water subphase (MilliQ) of separate compartments on the trough and compressed to 25 mN m$^{-1}$. The hemicyanine was deposited on the first upstroke at a rate of 60 µm/sec followed by the spacer on the downstroke; the process was repeated for up to 300 layers and transfer ratios of unity were maintained. A series of films having different numbers of bilayers was prepared.

Figure 1:
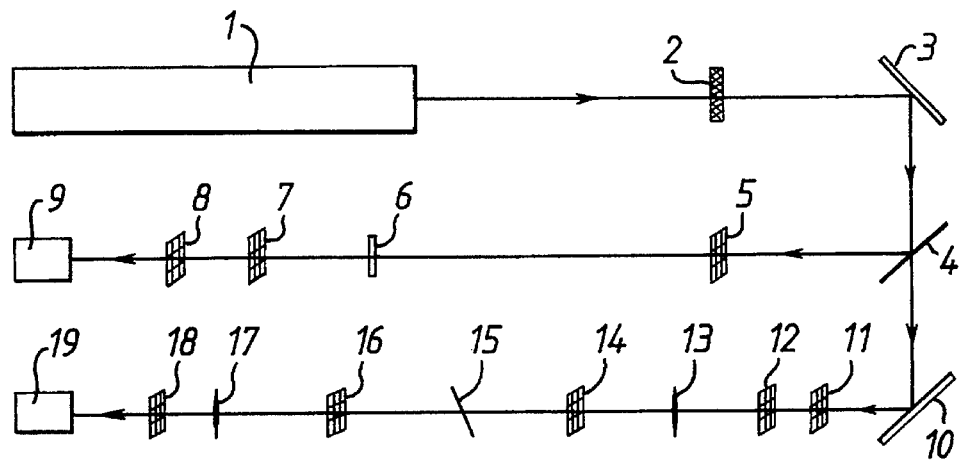
FIG. 1 illustrates schematically an apparatus for conducting SHG measurements.

SHG measurements were carried out using the apparatus schematically shown in FIG. 1 in which 1 represents a Nd/YAG laser, 2 is an attenuator, 3 is an infrared mirror, 4 is a beam splitter, 5 are visible blocking filters, 6 is a Y cut quartz plate reference, 7 is an infrared blocking filter, 8 is a 532 nm narrow bandpass filter, 9 is a photomultiplier tube, 10 is an infrared mirror, 11 is a Glan Thompson polariser, 12 is a halfwave plate, 13 is a Lens, 14 are visible blocking filters, 15 is the Langmuir-Blodgett film, 16 is an infrared blocking filter, 17 is a lens, 18 is a 532 nm narrow bandpass filter and 19 is a photomultiplier tube. Films were irradiated with light from a Q-switched Nd:YAG laser (1.064 µm; pulse width 10 ns; repetition rate 2 Hz) with the p-polarised beam incident to the substrate at 45°. SHG from a Y-cut quartz plate reference and LB film were monitored simultaneously using fast rise-time photomultiplier tubes (Philips XP 2020) and a dual channel Hewlett-Packard 54111D digitising oscilloscope. Uniformity of deposition was assessed by using computer-controlled translation and vertical stages to map the SH intensity from the LB film. In this work the mean SH intensity is compared with the corresponding signal from an LB monolayer of the hemicyanine dye, E-N-docosyl-4-[2-(4-dimethylaminophenyl)ethenyl] pyridinium bromide.

Figure 2:
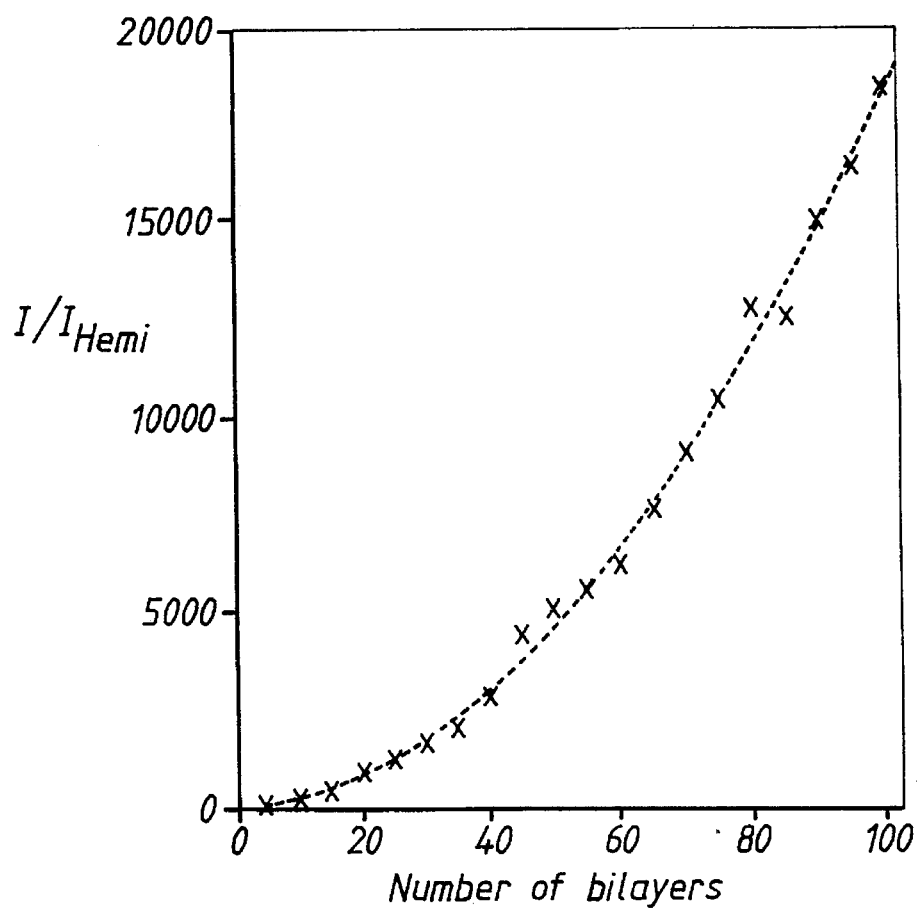
FIG. 2 shows a plat of SHG measurement on an interleave Langmuir-Blodgett film structure.

SHG measurements on the interleaved LB film structure, shown graphically in FIG. 2, confirm the compatibility of the layers, the intensity increasing quadratically with the number of layers to about 18,000 times the docosyl-hemicyanine value for films comprising 200 layers (100 bilayers) and 40,000 times for films comprising 300 layers (150 bilayers). The signal did not deteriorate with time over a period of 18 months. The second order non-linear optical coefficient (d) was 50 pm/V, the highest obtained for a multilayer interleaved film.

EXAMPLE 2

E-N-octadecyl-4-[2-(4-methoxyphenyl) ethenyl]pyridinium iodide was obtained and formed into a multi-layer interleaved film using 4,4'-dioctadecyl-3,5,3',5'-tetramethyldipyrrylmethene hydrobromide as the spacer and the technique described in relation to Example 1. Quadratic SHG enhancement was obtained.

EXAMPLE 3

Z-β-(N-octadecyl-4-pyridinium)-α-cyano-4-styrylidcyano-methanide was obtained and formed into a multi-layer interleaved film using the same spacer and techniques described in Example 2. Quadratic SHG enhancement was obtained.

I claim:

1. An ordered non-centrosymmetric optically non-linear material comprising a multi-layer Langmuir-Blodgett film comprising alternate layers of an optically non-linear amphiphilic compound and a spacer compound, said spacer compound having the general formula

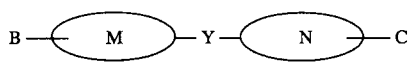

wherein M and N represent carbocyclic or heterocyclic groups each respectively having at least one hydrophobic substituent group B or C containing a minimum of six carbon atoms and Y represents a divalent bridging group or atom.

2. A material according to claim 1 wherein Y represents a divalent organic group which comprises no more than four carbon atoms.

3. A material according to claim 1 where M and N represent unsaturated carbocyclic or heterocyclic ring systems.

4. A material according to claim 1 wherein Y represents a methylene group or an ethylene group.

5. A material according to claim 1 where Y represents an alkylene group.

6. A material according to claim 1 wherein M and N represent unsaturated ring systems and Y represents an unsaturated bridging group such that the spacer compound is a conjugated compound in which the conjugation extends across the divalent group Y.

7. A material according to claim 1 characterised in that B and C which may be the same or different represent alkyl, alkenyl, alkanoyl or alkoxy groups comprising from 8 to 30 carbon atoms.

8. A material according to claim 1 wherein the spacer molecule has the general formula:

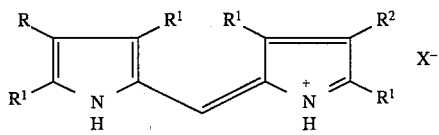

wherein R and $R^2$ which may be the same or different represent alkyl, alkenyl, alkanoyl or alkoxy groups comprising from 8 to 30 carbon atoms; the substituents $R^1$ which may be the same or different represent hydrogen atoms or alkyl groups comprising 1 to 4 carbon atoms and $X^-$ represents a counter anion.

9. A material according to claim 1 wherein the optically nonlinear compound is a molecule having the general formula;

wherein either A or D is substituted by a single hydrophobic group; D represents an electron donating group; π represents a conjugated bridging group and A-represents an electron accepting group.

10. A material according to claim 1 wherein the optically nonlinear compound has the general formula:

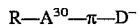

wherein R represents a hydrophobic alkyl or alkenyl group comprising from 8 to 30 carbon atoms; $A^+$ represents a pyridinium, pyrimidinium, quinolinium, isoquinolinium, benzothiazolium or thiazolium cation and $D^-$ represents $O^-$ or $—C(CN)_2—$.

11. A material according to claim 1 wherein the optically nonlinear compound has the general formula:

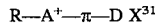

wherein R represents a hydrophobic alkyl or alkenyl group comprising from 8 to 30 carbon atoms; $A^+$ represents a pyridinium, pyrimidinium, quinolinium, isoquinolinium, benzothiazolium or thiazolium cation; D represents an amino, N-alkylamino (R'NH—), N,N-dialkylamino (R'R"N—), hydroxyl, alkoxy (R'O—) or alkylthio (R'S—) group wherein R' and R" comprise from 1 to 4 carbon atoms; $X^-$ represents a counter anion.

12. A material according to claim 1 wherein the optically nonlinear compound has the general formula:

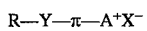

wherein R represents a hydrophobic alkyl or alkenyl group comprising from 8 to 30 carbon atoms; Y represents —O—, —S—, —NH— or —NR'— wherein R' is an alkyl group comprising from 1 to 4 carbon atoms; $A^+$ represents a pyridinium, pyrimidinium, quinolinium, isoquinolinium, benzothiazolium or thiazolium cation and $X^-$ represents a counter anion.

13. A material according to claim 7 wherein B and C represent alkyl, alkenyl, alkanoyl or alkoxy groups comprising from 14 to 22 carbon atoms.

14. A material according to claim 7 wherein B and C represent straight chain alkyl groups.

15. A material according to claim 7 wherein B and C are identical.

16. A material according to claim 8 wherein substituents R and $R^2$ represent alkyl, alkenyl, alkanoyl or alkoxy groups comprising from 16 to 22 carbon atoms.

17. A material according to claim 11 wherein R and $R^2$ are identical.

18. A material according to claim 8 wherein R and $R^2$ represent alkyl, alkenyl or alkoxy groups wherein the number of carbon atoms differs by not more than four.

19. A material according to claim 9 wherein D represents a hydroxyl, alkoxy, alkylthio, amino, N-alkylamino or N,N-dialkylamino group.

20. A material according to claim 9 wherein A represents a nitro, cyano, keto or aldehyde group.

21. A material according to claim 9 wherein π represents a —CH=CH—, —CH=N—, —N=N—, or —Ar— wherein Ar represents an aromatic ring especially a benzene or a pyridine ring or multiples or combinations thereof.

22. A material according to claim 9 wherein A represents a nitro, cyano, acetyl or aldehyde group and D represents an alkoxy (RO—), alkylthio (RS—), amino (RR'N—) group wherein R is a hydrophobic substituent, and R' is a hydrogen atom or alkyl group comprising from 1 to 4 carbon atoms.

23. A material according to claim 9 wherein D represents an amino, N-alkylamino (R'NH—), N,N-dialkylamino (R'R"N—), alkoxy (R'O—) or alkylthio (R'S—) group wherein R' and R" comprise from 1 to 4 carbon atoms; A represents a keto group (—C(O)R) wherein R is a hydrophobic substituent.

24. A material according to claim 10 wherein R is attached to a nitrogen atom which forms part of a heterocyclic ring.

25. A material according to claim 12 wherein an alkyl group is attached to the nitrogen atom of the $A^+$ cation.

26. A material according to claim 22 wherein substituents R' and R" are methyl and substituent R is an alkyl or alkenyl group comprising from 16 to 22 carbon atoms.

27. A material according to claim 22, wherein R is an alkyl or alkenyl group comprising 8 to 30 carbon atoms.

28. A material according to claim 23, wherein R is an alkyl or alkenyl group comprising 8 to 30 carbon atoms.

29. A process for the production of a material according to claim 1, which process comprises the steps of:

depositing a Langmuir-Blodgett film of an optically nonlinear amphiphilic compound on an upstroke of a two compartment deposition trough; and depositing a Langmuir-Blodgett film of the spacer on the downstroke.

* * * * *